United States Patent
Olgaard

(10) Patent No.: US 9,232,419 B2
(45) Date of Patent: Jan. 5, 2016

(54) SYSTEM AND METHOD FOR TESTING WIDE BAND DATA PACKET SIGNAL TRANSCEIVERS USING NARROW BAND TESTERS

(71) Applicant: LITEPOINT CORPORATION, Sunnyvale, CA (US)

(72) Inventor: Christian Volf Olgaard, Saratoga, CA (US)

(73) Assignee: LITEPOINT CORPORATION, Sunnyvale, CA (US)

( * ) Notice: Subject to any disclaimer, the term of this patent is extended or adjusted under 35 U.S.C. 154(b) by 239 days.

(21) Appl. No.: 14/029,905

(22) Filed: Sep. 18, 2013

(65) Prior Publication Data
US 2015/0078196 A1 Mar. 19, 2015

(51) Int. Cl.
*H04B 17/00* (2015.01)
*H04W 24/06* (2009.01)
*H04L 12/26* (2006.01)

(52) U.S. Cl.
CPC ............... *H04W 24/06* (2013.01); *H04B 17/00* (2013.01)

(58) Field of Classification Search
CPC ... H04B 17/0085; H04B 17/00; H04W 24/06; H04W 24/08
USPC ............................ 375/224; 370/252, 241, 338
See application file for complete search history.

(56) References Cited

U.S. PATENT DOCUMENTS

| | | | |
|---|---|---|---|
| 8,761,025 B2* | 6/2014 | Lee et al. | 370/241 |
| 2009/0094492 A1* | 4/2009 | Music et al. | 714/715 |
| 2009/0279673 A1 | 11/2009 | Maffre | |
| 2011/0103235 A1* | 5/2011 | Luong et al. | 370/245 |
| 2011/0242984 A1* | 10/2011 | Ponnuswamy | 370/241 |
| 2012/0113829 A1* | 5/2012 | Olgaard et al. | 370/252 |
| 2012/0121001 A1* | 5/2012 | Olgaard et al. | 375/224 |
| 2012/0197582 A1 | 8/2012 | Richardson | |
| 2012/0269288 A1* | 10/2012 | Olgaard et al. | 375/296 |
| 2013/0100987 A1 | 4/2013 | Picard | |

OTHER PUBLICATIONS

"IQXEL Connectivity Test System WLAN, Bluetooth, Zigbee and Dect Testing", published May 2013 by LitePoint, a Teradyne Company.
International Search Report and Written Opinion in PCT/US2014/050276 issued on Nov. 7, 2014, 11 pages.

* cited by examiner

*Primary Examiner* — Charles C Jiang
*Assistant Examiner* — Will Lin
(74) *Attorney, Agent, or Firm* — Vedder Price, P.C.

(57) ABSTRACT

System and method for using multiple data packet signal testers having narrower data packet signal bandwidths for testing multiple data packet signal transmitters having wider data packet signal bandwidths. Using multiple data packet signal testers with narrower receiver bandwidths to process respective portions of the wider bandwidth of the data packet signals produced by the devices under test (DUTs) enables use of lower cost, narrower-bandwidth test equipment to test wide-bandwidth signals.

20 Claims, 4 Drawing Sheets

SYSTEM AND METHOD FOR TESTING WIDE BAND DATA PACKET SIGNAL TRANSCEIVERS USING NARROW BAND TESTERS

BACKGROUND

The present invention relates to testing data packet transceivers, and in particular, to testing wide band data packet signal transceivers using narrow band test equipment.

Many of today's electronic devices use wireless technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless technologies must adhere to various wireless technology standard specifications.

When deciding such wireless devices, engineers take extra care to ensure that such devices will meet or exceed each of their included wireless technology prescribed standard-based specifications. Furthermore, when these devices are later being manufactured in quantity, they are tested to ensure that manufacturing defects will not cause improper operation, including their adherence to the included wireless technology standard-based specifications.

For testing these devices following their manufacture and assembly, current wireless device test systems employ a subsystem for analyzing signals received from each device. Such subsystems typically include at least a vector signal generator (VSG) for providing the source signals to be transmitted to the device under test, and a vector signal analyzer (VSA) for analyzing signals produced by the device under test. The production of test signals by the VSG and signal analysis performed by the VSA are generally programmable so as to allow each to be used for testing a variety of devices for adherence to a variety of wireless technology standards with differing frequency ranges, bandwidths and signal modulation characteristics.

As part of the manufacturing of wireless communication devices, one significant component of production cost is costs associated with manufacturing tests. Typically, there is a direct correlation between the cost of test and the sophistication of the test equipment required to perform the test. Thus, innovations that can preserve test accuracy while minimizing equipment costs (e.g., increasing costs due to increasing sophistication of necessary test equipment, or testers) are important and can provide significant costs savings, particularly in view of the large numbers of such devices being manufactured and tested.

For example, the commonly known and widely used wireless standard known as "WiFi" is the result of a succession of standards and for which the signal bandwidth has grown to include orthogonal frequency division multiplex (OFDM) signals up to 160 megahertz (MHz) wide (e.g., IEEE 802.11 ac standard). However, test equipment designed to test compliance with WiFi standards are in most cases limited to signal bandwidths of 80 MHz or less. Thus, such a tester is not adequate for testing a WiFi signal whose bandwidth exceeds 80 MHz. Accordingly, this would preclude testing IEEE802.11ac standard signals of 160 MHz. Increasing the capability of this test equipment to support measurements of 160 MHz wide signals would increase its cost. And, since few test points exist within these 160 MHz wide signal channels, such significant cost increases for the test equipment would yield little benefit in terms of additional testing capability.

Further, wireless devices designed for the IEEE 802.11ac standard are also capable of operating under the IEEE 801.11n standard with signal bandwidths of 40 MHz or less. Thus, a single tester applied to testing such a device would be capable of testing the IEEE 802.11n standard signals but would not be able to test the 160 MHz wide IEEE 802.11 ac standard signal. Instead, the required tester would need to be capable of capturing and analyzing signals of 160 MHz or more. The cost of such test systems is considerably higher than that of current testers capable of testing 80 MHz wide signals, and can result in unnecessary redundancy, since much of the baseband processing engines can be shared between the narrower and wider radio frequency (RF) signal paths. Further, many more test points exist for 20, 40 and 80 MHz wide signal channels, as compared to the 160 MHz wide signal channels. Accordingly, the acquisition costs of a tester capable of testing both IEEE 802.11n and 802.11ac signals up through the full 160 MHz wide frequency band is greater, thereby affecting the overall cost of manufacturing test for such advanced wireless devices.

Accordingly, it would be desirable to have a technique for testing increasingly sophisticated DUTs without necessarily requiring increasingly sophisticated testers.

SUMMARY

In accordance with the presently claimed invention, a system and method are provided for using multiple data packet signal testers having narrower data packet signal bandwidths for testing multiple data packet signal transmitters having wider data packet signal bandwidths. Using multiple data packet signal testers with narrower receiver bandwidths to process respective portions of the wider bandwidth of the data packet signals produced by the devices under test (DUTs) enables use of lower cost, narrower-bandwidth test equipment to test wide-bandwidth signals.

In accordance with one embodiment of the presently claimed invention, a system for using multiple data packet signal receivers having narrower data packet signal bandwidths for testing multiple data packet signal transmitters having wider data packet signal bandwidths includes:

first and second signal paths for conveying, from one or more devices under test (DUTs), first and second data packet signals having a plurality of data packet signal transmission frequency bandwidths including first and second data packet signal transmission frequency bandwidths, respectively, each of which is no greater than a predetermined frequency bandwidth and is substantially centered about a respective DUT data packet signal carrier frequency intermediate first and second data packet signal carrier frequencies;

first and second testers with first and second data packet signal test receivers, respectively, and adapted to operate in a plurality of test modes including a first test mode with first and second data packet signal reception frequency bandwidths, respectively, each of which is less than said predetermined frequency bandwidth, is no less than a half of the predetermined frequency bandwidth and is centered about the first and second data packet signal carrier frequencies, respectively, which are separated by no more than one of said first and second data packet signal reception frequency bandwidths; and signal routing circuitry external to and coupled between the first and second signal paths and the first and second testers, and responsive to one or more routing control signals by routing the first and second data packet signals to the first and second testers, wherein during a first time interval, a first portion of the first data packet signal is received by one of the first and second testers, and a second portion of the first data packet signal is received by another of the first and second testers, and during a second time interval, a first portion of the second data packet signal is received by one of the first and second testers, and a second portion of the second data packet signal is received by another of the first and second testers.

In accordance with another embodiment of the presently claimed invention, a method for using multiple data packet signal receivers having narrower data packet signal bandwidths for testing multiple data packet signal transmitters having wider data packet signal bandwidths includes:

providing first and second signal paths for conveying, from one or more devices under test (DUTs), first and second data packet signals having a plurality of data packet signal transmission frequency bandwidths including first and second data packet signal transmission frequency bandwidths, respectively, each of which is no greater than a predetermined frequency bandwidth and is substantially centered about a respective DUT data packet signal carrier frequency intermediate first and second data packet signal carrier frequencies;

providing first and second testers with first and second data packet signal test receivers adapted to operate in a plurality of test modes including a first test mode with first and second data packet signal reception frequency bandwidths, respectively, each of which is less than said predetermined frequency bandwidth, is no less than a half of the predetermined frequency bandwidth and is centered about the first and second data packet signal carrier frequencies, respectively, which are separated by no more than one of said first and second data packet signal reception frequency bandwidths; and routing, externally, the first and second data packet signals to the first and second testers, wherein during a first time interval, a first portion of the first data packet signal is received by one of the first and second testers, and a second portion of the first data packet signal is received by another of the first and second testers, and during a second time interval, a first portion of the second data packet signal is received by one of the first and second testers, and a second portion of the second data packet signal is received by another of the first and second testers.

DETAILED DESCRIPTION

Figure 1:
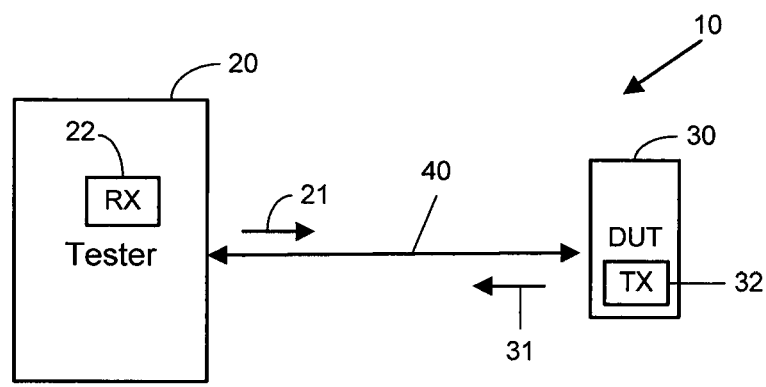
FIG. 1 depicts a conventional test environment for testing data packet transceivers.
Figure 1:
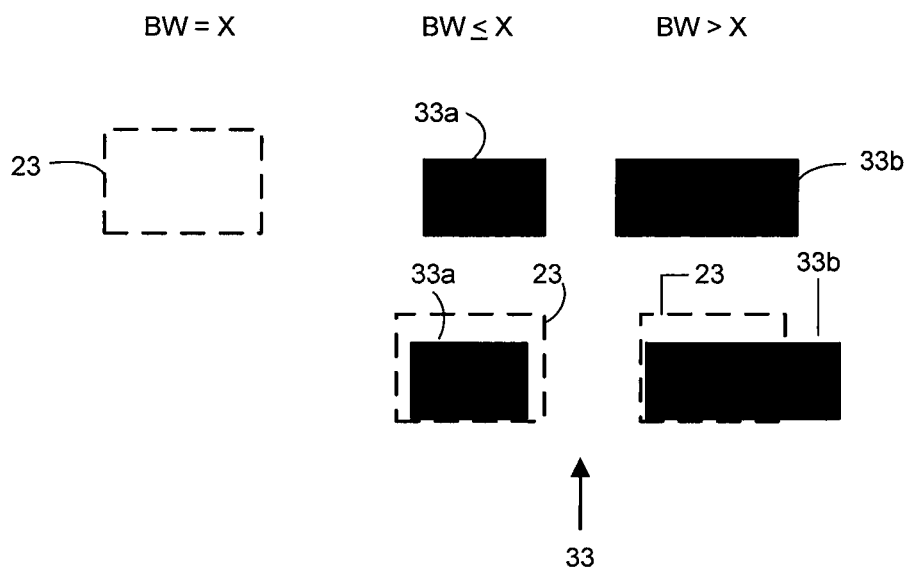

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

As discussed in more detail below, in accordance with the presently claimed invention, existing wireless system test equipment having limited receive signal bandwidth can be used to test wireless device signals producing signals having greater bandwidths. For example, in cases of testing signals in accordance with the IEEE802.11n and 802.11ac (160 MHz) standards, a pair of testers with 80 MHz bandwidths can be used to measure all applicable signals, e.g., 20, 40, 80 and 160 MHz wide signals, thereby becoming capable of testing both signal standards.

In accordance with the presently claimed invention, sequential testing of two devices under test (DUTs) employing the advanced 160 MHz wide signals becomes enabled. The same two testers also enable concurrent (e.g., parallel) testing of the 20, 40 and 80 MHz wide signals for the DUTs, and further enables interleaved testing for the 160 MHz wide signals. Even though few additional test points (e.g., three or four) are necessary for such testing, the overhead costs associated with now using two systems capable of the narrower 80 MHz wide signals are small. Therefore, in test flows involving testing of 20, 40, 80 and 160 MHz wide signals, in accordance with the presently claimed invention, both speed and cost advantages can be obtained without requiring significantly more expensive high-bandwidth testers or distribution of different portions of the test flow across different test systems. Further, in addition to testing transmitters of multiple DUTs, the transmitters of a single multiple-input, multiple-output (MIMO) DUT can be tested as well.

Referring to FIG. 1, the typical test environment 10 includes the tester 20 and DUT 30, coupled by a RF signal path 40, typically in the form of a conductive signal path, such as coaxial cable and connectors. This signal path 40 conveys signals 21 transmitted by the tester (e.g., provided by the VSG) for reception by the DUT 30, and signals 31 transmitted by a transmitter 32 within the DUT 30 for reception by a receiver 22 within the tester 20 (e.g., as part of the VSA). As discussed above, the tester receiver 22 will have a maximum signal bandwidth 23 for capturing and processing the signals 31 from the DUT 30, and the DUT transmitter 32 will transmit signals 31 having a signal bandwidth 33. In some cases, e.g., in accordance with some IEEE signal standards as discussed above, the transmit signal bandwidth 33a will be less than the tester bandwidth 23, while in other cases, the transmit signal bandwidth 33b will be greater than the tester bandwidth 23. In the case of the former, the tester 20 can adequately test the DUT signals 31, but in the case of the latter, the tester 20 cannot adequately test the DUT signals 31.

Figure 2:
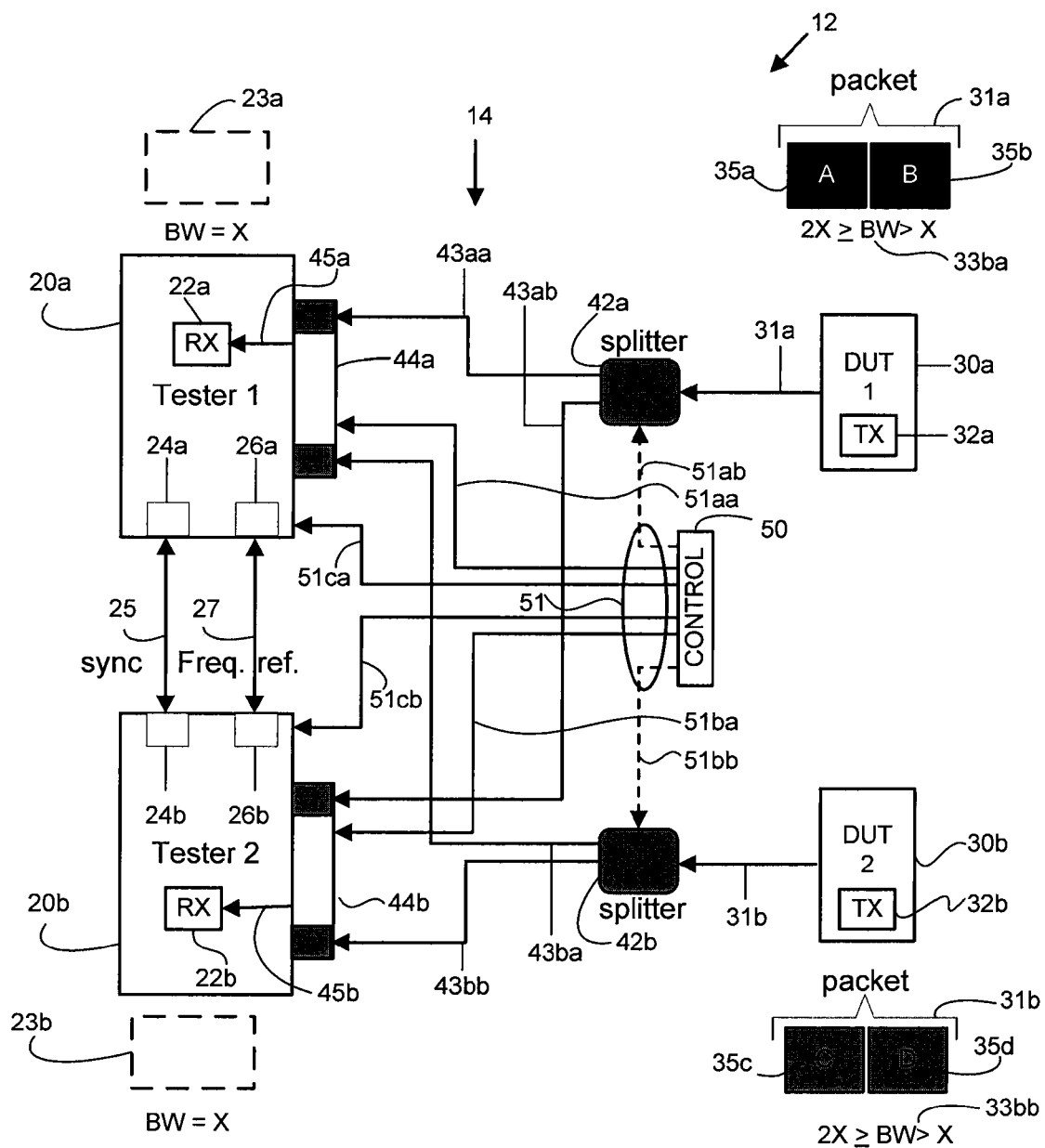
FIG. 2 depicts a test environment for testing data packet transceivers in accordance with exemplary embodiments of the presently claimed invention.
Figure 2:
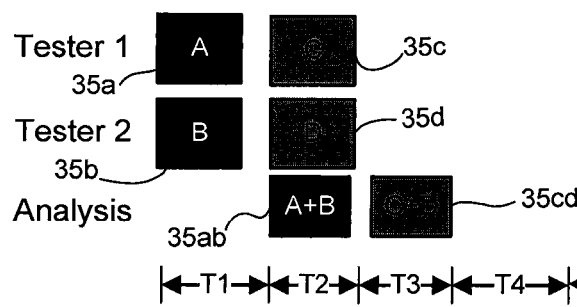

Referring to FIG. 2, in accordance with the presently claimed invention, the testing environment 12 can be expanded to include two testers 20a, 20b and signal routing circuitry 14 providing the necessary signal paths for conveying the signals 31a, 31b from multiple DUTs 30a, 30b to the testers 20a, 20b. (For purposes of this exemplary embodiment, the DUTs 30a, 30b are presumed to be separate DUTs with respective transmitters 32a, 32b, e.g., in the form of single-input, single-output (SISO) DUTs. However, in accordance with other exemplary embodiments, the two transmitters 32a, 32b as depicted can be two transmitters of a single DUT 30 in the form of a MIMO DUT.)

In accordance with one exemplary embodiment, the signal routing circuitry 14 includes signal splitters 42a, 42b (also known as signal dividers) and switching circuitry 44a, 44b. The transmit signals 31a, 31b are split (e.g., divided or replicated) by the signal splitters 42a, 42b to provide replicated transmit signals 43aa, 43ab, 43ba, 43bb to the switches 44a, 44b. In accordance with control signals 51aa, 51ba from control circuitry 50 (which may be a computer or other control circuitry separate from or part of the signal routing circuitry 14), the switches 44a, 44b switch their respective DUT signals 43aa, 43ba, 43ab, 43bb to be provided as the respective DUT signals 45a, 45b for the tester receivers 22a, 22b. (Control signals 51ab, 51bb can also be provided for the controlling actions of the signal splitters 42a, 42b.) This allows respective portions 35a, 35b, 35c, 35d of the DUT signals 31a, 31b to be routed to the receivers 22a, 22b of the testers, 20a 20b (discussed in more detail below). Alternatively, the switches 44a, 44b can be part of, e.g., internal to, the respective testers 20a, 20b.

The control circuitry 50 can also provide control signals 51ca, 51cb to the testers 20a, 20b, e.g., for controlling the nominal center frequencies or bandwidths of the receivers 22a, 22b. Alternatively, control of the receivers 22a, 22b can be achieved through control signals originating elsewhere, e.g., from a remote controller (not shown), or a local or remote computer (not shown) used to process and/or display test results from the testers 20a, 20b.

In accordance with exemplary embodiments, the first 35a and second 35b portions of the first DUT signal 31a are the signal components occupying the lower half and higher half, respectively, of the first DUT signal frequency bandwidth 33ba. Similarly, the first 35c and second 35d portions of the second DUT signal 31b are the signal components occupying the lower half and higher half, respectively, of the second DUT signal frequency bandwidth 33bb.

In accordance with other exemplary embodiments, additional switches (e.g., single-pole, double-throw switches) can be used instead of signal splitters 42a, 42b, with additional appropriate control signals 51ab, 51bb from the control circuitry 50 for switching, or routing, the DUT signals 31a, 31b to the appropriate switches 44a, 44b.

Operation of this test environment 12 in accordance with exemplary embodiments would proceed in accordance with the timing diagram as shown. During time interval T1 the first DUT signal 31a would be conveyed to both testers 20a, 20b with a first portion 35a processed by the first receiver 22a with its bandwidth 23a, and a second portion 35b processed by the second receiver 22b with its bandwidth 23b. Similarly, during a subsequent time interval T2, the second DUT signal 31b is conveyed to the first 22a and second 22b receivers for processing of its portions 35c, 35d with their respective bandwidths, 23a, 23b.

Following reception of the first DUT signal 31a, its captured signal portions 35a, 35b are combined 35ab and processed, e.g., during time interval T2. Similarly, following reception of the second DUT signal 31b, its captured signal portions 35c, 35d are combined 35cd and processed, e.g., during time interval T3. In accordance with exemplary embodiments, the captured signal portions 35a, 35b, 35c, 35d can be combined 35ab, 35cd in either one of the testers 20a, 20b for processing by the same tester, for transfer to the other tester for processing, or for transfer elsewhere (not shown) for processing. Alternatively, the captured signal portions 35a, 35b, 35c, 35d can be transferred elsewhere (not shown) for combining 35ab, 35cd and processing. In accordance with further exemplary embodiments, the captured signal portions 35a, 35b, 35c, 35d need not necessarily be combined, but can be processed separately, e.g., by processing signal portion 35a during time interval T2, processing signal portion 35b during time interval T3, processing signal portion 35c during time interval T4, and processing signal portion 35d during time interval T5.

To establish and maintain proper synchronization and frequency separation of the data packet signal reception bandwidths of the respective tester receivers 22a, 22b, the testers, 20a, 20b share common synchronization 25 and frequency reference 27 signals between respective synchronization circuits 24a, 24b and frequency synthesis or locking circuits 26a, 26b.

These signals, 25, 27 can be provided by external sources (not shown), or generated within one tester and shared with the other tester.

Figure 3:
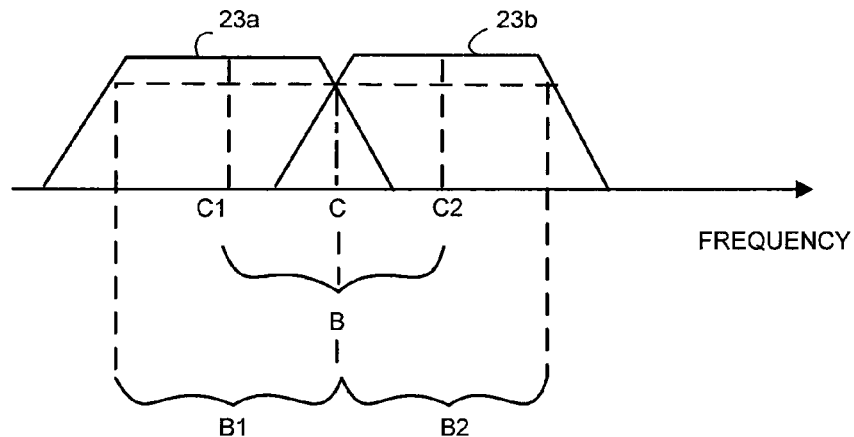
FIG. 3 depicts tester bandwidth combining for testing a wideband DUT in accordance with exemplary embodiments of the presently claimed invention.

Referring to FIG. 3, coordination of the data packet signal reception bandwidths of 23a, 23b of the receivers 22a, 22b can be better understood. For example, during the DUT signal reception discussed above, the testers can be configured such that the first receiver bandwidth 23a, having a bandwidth B1, is centered about a first nominal carrier frequency C1, while the second data packet signal reception bandwidth 23b, is centered about another, e.g., higher, nominal carrier frequency C2. These carrier frequencies C1, C2 are preferably separated by a frequency band B, which, in turn, is preferably equal to (or slightly less than) each of the respective receiver bandwidths 23a/B1, 23b/B2. As a result, the combined receiver bandwidths B1+B2 is equal to or greater than the bandwidth necessary for testing a wideband data packet signal centered about a nominal wideband signal carrier frequency C, as discussed above. Also, to compensate for expected variances in circuit and performance characteristics, the receiver bandwidths 23a/B1, 23b/B2 will be sufficiently greater than half of the frequency band B so as to provide some overlap of their respective bandwidths 23a/B1, 23b/B2 and thereby ensure reception of all necessary signal components for reliable capturing of the data packet signal.

Figure 4:
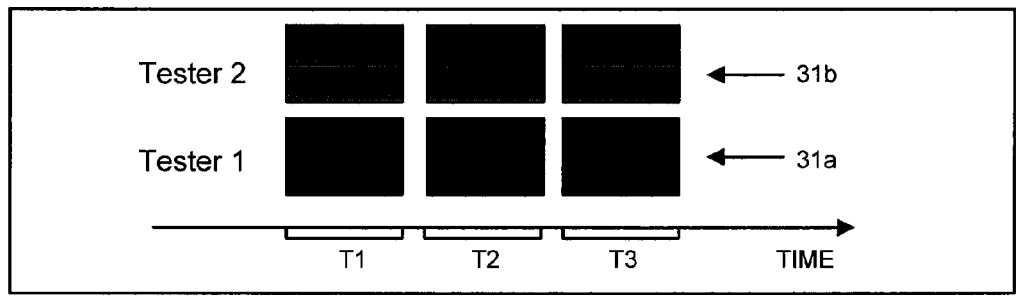
FIG. 4 depicts an exemplary flow of data packets when using the test environment of FIG. 2 for concurrent testing of multiple DUTs.

Referring to FIG. 4, as discussed above, data packet signals of X bandwidth or less are tested more frequently than those having bandwidth greater than the bandwidths 23a, 23b of the testers, 20a, 20b. Accordingly, the routing circuitry 14 can be configured so that the testers 20a, 20b test the DUTs 30a, 30b concurrently. For example, the tester switches 44a, 44b (and DUT switches if used in place of the splitter 42a, 42b) are controlled by the controller 50 such that the first DUT signal 31a is provided to the first tester receiver 22a and the second DUT signal 31b is provided to the second tester receiver 22b for testing such signals 31a, 31b concurrently during successive time intervals, T1, T2, . . . .

Figure 5:
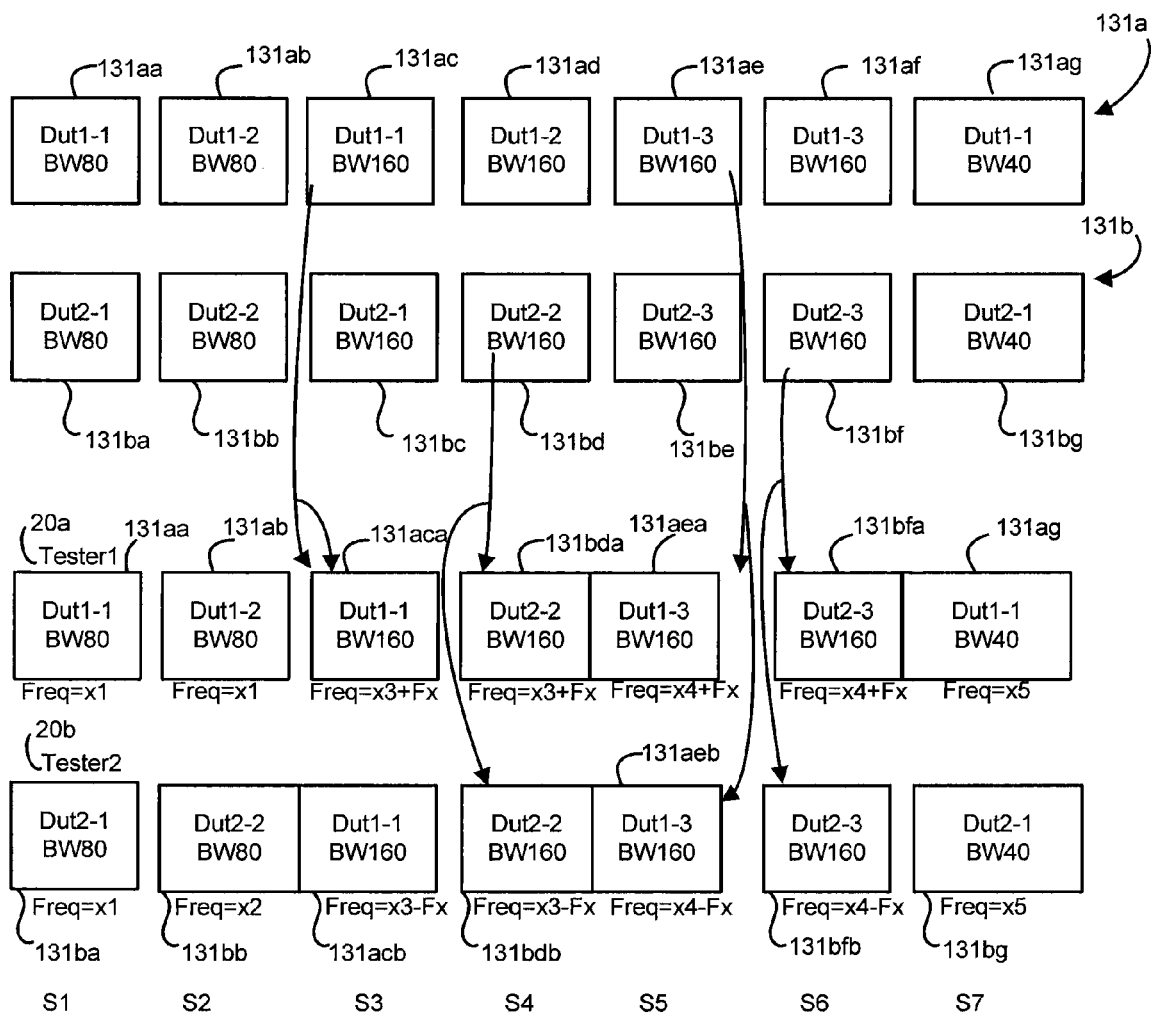
FIG. 5 depicts tester bandwidth combining for testing a wideband DUT in accordance with further exemplary embodiments of the presently claimed invention.

Referring to FIG. 5, the flexible nature of the test environment and method in accordance with exemplary embodiments of the presently claimed invention can perhaps be better appreciated in the context of a sequence of data packet signals having varying signal bandwidths. For purposes of this example, the first DUT 30a transmits a sequence of data packet signals 131a having signal bandwidths of 80 MHz (BW80), 160 MHz (BW160), and 40 MHz (BW40), as indicated. Similarly, the second DUT 30b transmits a sequence of data packet signals 131b also having bandwidths of 80, 160 and 40 MHz, as indicated. During the first two signal subsequences S1 and S2, the first DUT signals 131aa, 131ab and second DUT signals 131ba, 131bb are received by the first tester 20a and second tester 20b, respectively, as indicated. During the third sub-sequence S3, the first 131ac and second 131bc DUT signals are wideband signals, i.e., with signal bandwidths exceeding those of the tester receivers 22a, 22b. Accordingly, the first DUT signal 131ac is conveyed (e.g., via the routing circuitry 14) to and received by both testers 20a, 20b, with one portion 131aca (e.g., the higher half of the signal bandwidth) received by the first tester 20a and another portion 131acb (e.g., the lower half of the signal bandwidth) received by the second tester 20b, as indicated. Meanwhile, the second DUT signal 131bc is not received by either tester 20a, 20b (e.g., and is simply terminated within the routing circuitry 14).

Similarly, during sub-sequences S4, S5 and S6, the DUT signals are wideband signals. Accordingly, during sub-sequence S4, respective portions 131bda, 131bdb of the second DUT signal 131bd are received by the first 20a and second 20b testers, while the first DUT signal 131ad is unused. During sub-sequence S5, respective portions 131aea, 131aeb are received by the first 20a and second 20b testers, while the second DUT signal 131be is unused. Similarly, during sub-sequence S6, respective portions 131bfa, 131bfb of the second DUT signal 131bf are received by the first 20a and the second 20b testers, while the first DUT signal 131af is unused. Subsequently, during sub-sequence S7, the DUT signals 131ag, 131bg are narrow band signals, i.e., with signal bandwidths no greater than those of the tester receivers 22a, 22b. Accordingly, the first 131ag and second 131bg DUT signals are conveyed to and received by the first 20a and second 20b testers, respectively.

Figure 6:
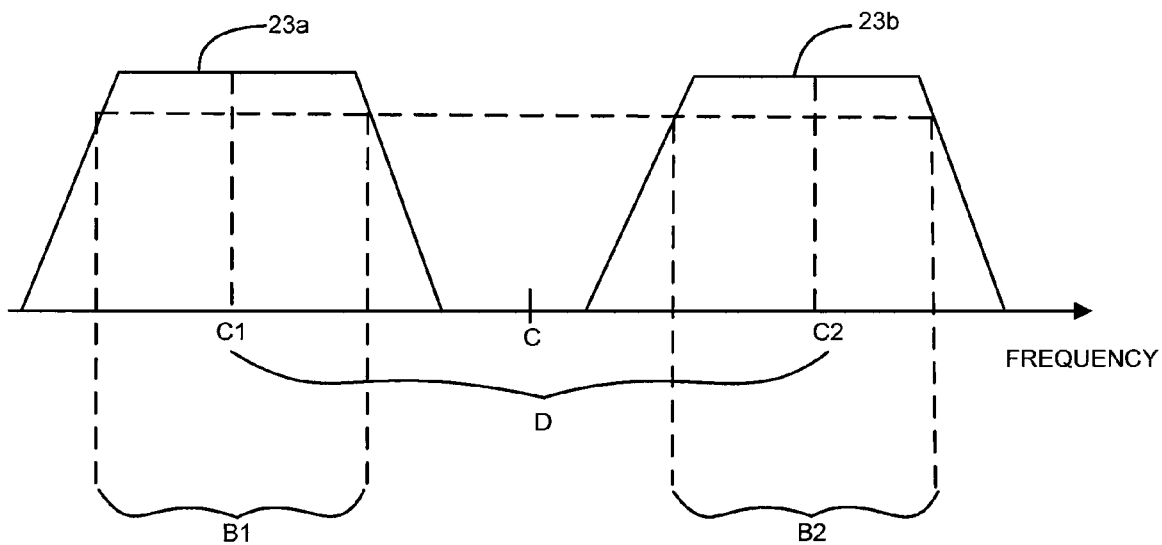
FIG. 6 depicts tester bandwidth combining for testing a wideband DUT in accordance with further exemplary embodiments of the presently claimed invention.

Referring to FIG. 6, in accordance with further exemplary embodiments, during the DUT signal reception discussed above, the testers can be configured such that the first receiver bandwidth 23a, having a bandwidth B1, is centered about a first nominal carrier frequency C1, while the second data packet signal reception bandwidth 23b, is centered about another, e.g., higher, nominal carrier frequency C2. These carrier frequencies C1, C2 are preferably separated by a frequency band D, which, in turn, is greater than either of the respective receiver bandwidths 23a/B1, 23b/B2 (i.e., D>B1 and D>B2). As a result, the separated receiver bandwidths B1, B2 allow for testing a data packet signal having two non-contiguous signal bands centered about a frequency C.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a system for using multiple data packet signal receivers having receiver data packet signal bandwidths for testing multiple data packet signal transmitters having transmitter data packet signal bandwidths, wherein said transmitter data packet signal bandwidths are wider than said receiver data packet signal bandwidths, comprising:

first and second signal paths for conveying, from one or more devices under test (DUTs), first and second data packet signals having a plurality of data packet signal transmission frequency bandwidths including first and second data packet signal transmission frequency bandwidths, respectively, each of which is no greater than a predetermined frequency bandwidth and together are centered about a respective DUT data packet signal carrier frequency intermediate first and second data packet signal carrier frequencies;

first and second testers with first and second data packet signal test receivers, respectively, and adapted to operate in a plurality of test modes including a first test mode with first and second data packet signal reception frequency bandwidths, respectively, each of which is less than said predetermined frequency bandwidth, is no less than a half of said predetermined frequency bandwidth and is centered about said first and second data packet signal carrier frequencies, respectively, which are separated by no more than one of said first and second data packet signal reception frequency bandwidths; and signal routing circuitry external to and coupled between said first and second signal paths and said first and second testers, and responsive to one or more routing control signals by routing said first and second data packet signals to said first and second testers, wherein during a first time interval, a first portion of said first data packet signal is received by one of said first and second testers, and a second portion of said first data packet signal is received by another of said first and second testers, and during a second time interval, a first portion of said second data packet signal is received by one of said first and second testers, and a second portion of said second data packet signal is received by another of said first and second testers.

2. The apparatus of claim 1, wherein said second time interval is subsequent to said first time interval.

3. The apparatus of claim 1, wherein:

said first portion of said first data packet signal is received by said one of said first and second testers during a first portion of said first time interval;

said second portion of said first data packet signal is received by said another of said first and second testers during a second portion of said first time interval;

said first portion of said second data packet signal is received by said one of said first and second testers during a first portion of said second time interval; and said second portion of said second data packet signal is received by said another of said first and second testers during a second portion of said second time interval.

4. The apparatus of claim 3, wherein:

said second portion of said first time interval is subsequent to said first portion of said first time interval; and said second portion of said second time interval is subsequent to said first portion of said second time interval.

5. The apparatus of claim 1, wherein said first and second testers are mutually coupled to share at least one of a tester synchronization signal and a tester frequency reference signal.

6. The apparatus of claim 1, further comprising one or more signal sources coupled to said first and second testers to provide at least one of said tester synchronization signal and tester frequency reference signal.

7. The apparatus of claim 1, wherein said first and second signal paths comprise first and second conductive radio frequency (RF) signal paths.

8. The apparatus of claim 1, wherein said signal routing circuitry comprises:
   signal dividing circuitry coupled to said first and second signal paths; and
   signal switching circuitry coupled between said signal dividing circuitry and said first and second testers.

9. The apparatus of claim 1, wherein:
   said first and second testers are further adapted to operate in a second test mode with third and fourth data packet signal reception frequency bandwidths, respectively; and
   during at least a third time interval, said first data packet signal is received by one of said first and second testers, and said second data packet signal is received by another of said first and second testers.

10. The apparatus of claim 1, wherein said first and second testers are further adapted to operate in a second test mode with third and fourth data packet signal reception frequency bandwidths, respectively, each of which is less than said predetermined frequency bandwidth and is centered about said first and second data packet signal carrier frequencies, respectively, which are separated by more than one of said first and second data packet signal reception frequency bandwidths.

11. A method for using multiple data packet signal receivers having receiver data packet signal bandwidths for testing multiple data packet signal transmitters having transmitter data packet signal bandwidths, wherein said transmitter data packet signal bandwidths are wider than said receiver data packet signal bandwidths, comprising:
   providing first and second signal paths for conveying, from one or more devices under test (DUTs), first and second data packet signals having a plurality of data packet signal transmission frequency bandwidths including first and second data packet signal transmission frequency bandwidths, respectively, each of which is no greater than a predetermined frequency bandwidth and together are centered about a respective DUT data packet signal carrier frequency intermediate first and second data packet signal carrier frequencies;
   providing first and second testers with first and second data packet signal test receivers, respectively, and adapted to operate in a plurality of test modes including a first test mode with first and second data packet signal reception frequency bandwidths, respectively, each of which is less than said predetermined frequency bandwidth, is no less than a half of said predetermined frequency bandwidth and is centered about said first and second data packet signal carrier frequencies, respectively, which are separated by no more than one of said first and second data packet signal reception frequency bandwidths; and
   routing, externally, said first and second data packet signals to said first and second testers, wherein during a first time interval, a first portion of said first data packet signal is received by one of said first and second testers, and a second portion of said first data packet signal is received by another of said first and second testers, and
   during a second time interval, a first portion of said second data packet signal is received by one of said first and second testers, and a second portion of said second data packet signal is received by another of said first and second testers.

12. The method of claim 11, wherein said second time interval is subsequent to said first time interval.

13. The method of claim 11, wherein:
   said first portion of said first data packet signal is received by said one of said first and second testers during a first portion of said first time interval;
   said second portion of said first data packet signal is received by said another of said first and second testers during a second portion of said first time interval;
   said first portion of said second data packet signal is received by said one of said first and second testers during a first portion of said second time interval; and
   said second portion of said second data packet signal is received by said another of said first and second testers during a second portion of said second time interval.

14. The method of claim 13, wherein:
   said second portion of said first time interval is subsequent to said first portion of said first time interval; and
   said second portion of said second time interval is subsequent to said first portion of said second time interval.

15. The method of claim 11, further comprising sharing between said first and second testers at least one of a tester synchronization signal and a tester frequency reference signal.

16. The method of claim 11, further comprising providing to said first and second testers at least one of a tester synchronization signal and a tester frequency reference signal.

17. The method of claim 11, wherein said providing first and second signal paths comprises providing first and second conductive radio frequency (RF) signal paths.

18. The method of claim 11, wherein said routing said first and second data packet signals to said first and second testers comprises:
   replicating said first and second data packet signals; and
   switching said replicated first and second data packet signals.

19. The method of claim 11, wherein:
   said first and second testers are further adapted to operate in a second test mode with third and fourth data packet signal reception frequency bandwidths, respectively; and
   during at least a third time interval, said first data packet signal is received by one of said first and second testers, and said second data packet signal is received by another of said first and second testers.

20. The method of claim 11, wherein said first and second testers are further adapted to operate in a second test mode with third and fourth data packet signal reception frequency bandwidths, respectively, each of which is less than said predetermined frequency bandwidth and is centered about said first and second data packet signal carrier frequencies, respectively, which are separated by more than one of said first and second data packet signal reception frequency bandwidths.

* * * * *